United States Patent Office 3,002,206
Patented Oct. 3, 1961

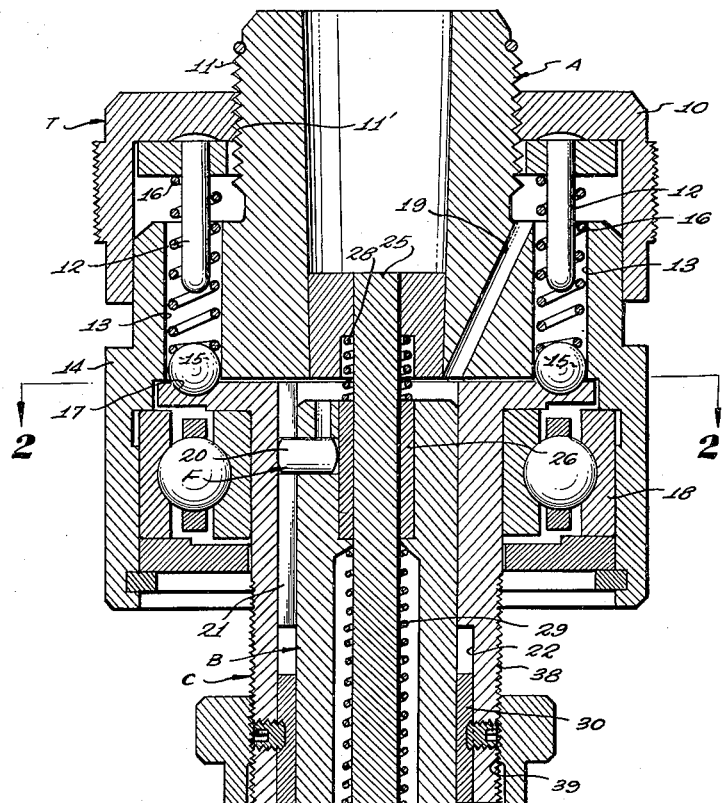

3,002,206
TAPPING ATTACHMENT WITH ADJUSTABLY YIELDABLE CLUTCH MEANS
Allan S. Johnson, Newport Beach, Calif., assignor to Tapmatic Corporation, Costa Mesa, Calif., a corporation of California
Filed Aug. 25, 1958, Ser. No. 756,831
2 Claims. (Cl. 10—135)

This invention relates to thread-cutting or tapping attachments for use with drilling machines, lathes and boring machines in association with the spindle of said devices.

The object of the invention is to provide an improved tapping attachment.

Another object is to provide a tapping attachment having a positive torque adjustment means limiting the torque force applied to the tapping tool.

Another object is to provide a tapping attachment having a free axial float means limiting the power applied to the tapping tool to rotative forces.

A further object is to provide a tapping attachment having a depth control means limiting the depth to which the tapping tool penetrates the work piece.

Still another object is to provide a tapping attachment having in combination the features of an adjustable means providing a positive torque limit, means providing free axial float thereby to limit the force applied to the tool to rotative forces, and means providing depth control thereby to limit the extent to which the tool engages the work piece, which attachment is of simple design and inexpensive to produce.

Other objects will be apparent as the invention is more fully hereinafter disclosed.

In accordance with these objects I have designed and devised a tapping attachment having the above noted features and advantages which is simple in design and inexpensive to manufacture, one specific embodiment of which is illustrated in the accompanying drawings and will be hereinafter described by way of example but not by way of limitation of the present invention.

In the drawings:

FIG. 1 is a vertical cross-sectional view of a tapping attachment improved in accordance with the present invention; and FIG. 2 is a horizontal cross-sectional view taken along plane 2—2 of FIG. 1.

Referring to the drawings, the tapping attachment shown therein is one designed for general utility in the art in the tapping of drill holes up to a diameter of about two inches.

The attachment is provided with the usual mechanical elements of such devices such as a member A adapted to be mounted onto a spindle to be rotatively driven thereby, a member B adapted to be rotatively driven by the member A, a clutch means C to engage the member B to the member A for driving the member B, and a tool-holding chuck means D mounted on the member B to be rotatively driven thereby.

In this basic combination of mechanical elements, common to all such tapping attachments, I have provided a means T providing a positive torque adjustment limiting the power to be applied to the member B thereby to prevent tap breakage; a means F providing a free axial float for the member B thereby limiting the forces applied to the member B to rotative forces and thus permitting the tap to determine its own lead to insure that the thread produced will conform to the thread on the tap; and a depth control means H permitting tapping to a predetermined depth in the work piece. The three said means are incorporated in the basic combination in such manner as to provide a simple, rugged construction adapted for inexpensive production and providing a prolonged operating and efficient service life for the tapping attachment.

Referring more specifically to these said improvements:

The means T providing a positive torque adjustment for the tapping attachment limiting the maximum torque applicable to the member B comprises in combination a cap 10 mounted on the rotatably driven member A to be movable therealong to a plurality of pre-set positions, as by engaging threaded sections 11—11'. The interior of the cap 10 is provided with a plurality of annularly spaced pins 12 seating in complementary annularly spaced bore passageways 13 in the base 14 of the rotatably driven member A. The axes of said bore passageways 13 lie substantially parallel to the axis of the member A. Driving balls 15 are disposed in each said bore passageway 13 and a compression spring means 16 is provided in each said bore passageway 13 to spring load the driving balls 15 into engagement with concave recesses 17 on the abutting surface of the clutch means C. It can be seen that by this arrangement the cap 10 when rotated on the engaging threads 11—11' upwardly lessens the spring load on the balls 15 and when rotated on the threads 11—11' downwardly increases the spring load on the balls 15 thereby to control and limit the torque applied to drive the clutch means C. By this means the maximum torque force applied to the member B may be pre-set.

Various other and substantially equivalent means and mechanisms may be substituted for the threaded cap means 10 without essential departure from the invention, as one skilled in the art will recognize.

The clutch means C is rotatably mounted within a depending sleeve portion of the base 14 of the driven member A by means of roller bearing 18 and means, such as an oil passageway 19, is provided to lubricate the abutting surfaces of the member A and the clutch C. With this arrangement it may be seen that when the torque applied to the clutch C by the member A exceeds the spring load applied to the driving balls 15, with resultant displacement of the driving balls 15 out of the concave recesses 17 in the clutch C, the member A continues to rotate without rotating the clutch C on the roller bearing 18.

The clutch means C is secured by a plurality of annularly spaced roller pins 20 to drive driven member B, the said roller pins 20 being fixedly mounted at one end in the member B adjacent its upper end with the opposite end of the roller pin 20 riding free in longitudinal slots 21, each of said slots 21 terminating at its bottom end in annular groove 22.

The member B is mounted for axial rotation on depending axle 25 secured at its upper end for axial rotation with member A and is sustained for axial rotation about the axis of the member A by spaced bearings 26—27. By this arrangement it may be recognized that the axle 25 is free to rotate by means of the bearings 26—27 independently of the member B and that when the clutch means C is being driven by the member A, the roller pins 20 transmit the rotary movement of the clutch means C to the member B. It will also be recognized that the member B is slidably mounted on the axle 25 by means of the roller pins 20.

To control and regulate the sliding movement of the member B on the axle 25, opposing compression springs 28—29 are provided above and below the bearing 26. The upper spring 28 is a cushioning spring and is of sufficient strength to limit the sliding movement of the member B upwardly on the axle 25 to a position short of contact with the member A. The lower spring 29 is a relatively light spring with a spring strength adapted to return the member B to the position shown in FIG. 1 from any sliding position below this position.

The member B is mounted in the clutch C for sliding movement therein by means of sleeve bearing 30 disposed adjacent the bottom end of the clutch C, the upper end of the sleeve bearing 30 forming the bottom wall or shoulder of the annular slot 21.

Chuck means D dependingly mounted on the bottom end of the member B for rotation therewith is a chuck means typical in the art in that it has the usual type of jaws 30, collet 31 and thimble 32 for actuating the chuck means D to engage a tapping tool for axial rotation therewith.

The depth control means H of the present invention comprises a collar 35 dependingly and adjustably mounted on the bottom end of the clutch means C, the said collar 35 being provided with an internal shoulder 36 thereon adjacent the bottom end thereof adapted to engage an outstanding shoulder 37 on the member B, thereby to limit the sliding movement of the member B on the axle 25. As indicated in the drawings the collar 35 is adjustably mounted on the bottom end of the clutch means C by means of engaging threaded sections 38—39. Other substantially equivalent means for adjustably mounting the collar 35 on the bottom end of the clutch means C may be employed without departure from the invention, as may also various other types of means for limiting the extent of sliding movement of member B on the axle 25 be employed without essential departure from the invention, as one skilled in the art will recognize.

It is believed apparent from the specific embodiment of the present invention illustrated in the drawings and hereinabove described that the improved tapping attachment of the present invention provides an attachment which by the means T controls and regulates to a precise degree the maximum torque to be applied to the driven member B by the driving member A; and that by the means F therein provided the only force applied to the tapping tool secured in the chuck D is the precise maximum rotating or torque force pre-set by the means T. This leaves the tapping tool free to determine its own lead in the tap hole and adapts the tool for pulling itself and the driven member B to which it is operatively connected into the hole being tapped against the relatively light spring resistance of the spring 29.

When the tapping operation is completed as may be limited by the depth control means H, the spring means 29 operates to gently spring urge the member B upwardly, on reversely driving the member A, thereby to withdraw the tapping tool from the tapped hole, during which reverse movement the tool is as free to determine its own lead in the reverse direction as in the forward direction, the force applied thereto being only rotary.

The improved tapping attachment of the present invention permits the repeated insertion of the tapping tool into and out of a tapped hole without in any way distorting the tapped threads thereof, a feature which other tapping attachments heretofore provided in the art failed to provide.

Having hereinabove disclosed the present invention generically and specifically and having described and illustrated the same in one specific embodiment thereof, it is believed apparent that the invention may be widely varied without substantial or essential departure therefrom and all modifications, departures, changes and alterations of the specific embodiment as herein described and illustrated are contemplated by me as may fall within the scope of the following claims.

What is claimed is:

1. In a tapping attachment having a first member adapted to be secured to a rotatable spindle for rotation therewith, a second member having a tool-holding means mounted on one end thereof and a clutch means mounted on the opposite end thereof for engaging the second member to the first member for rotation therewith, the improvement which comprises an adjustable means for engaging said clutch means to said first member for rotation therewith, said adjustable means limiting the torque force applied by said first member to said second member through said clutch means to a selected maximum torque force, means slidably mounting the second member on said first member and in and to said clutch means for relative sliding movement therebetween thereby to limit the force applied to the tool to rotary forces, said means for slidably mounting the second member on said first member and in and to said clutch means comprising an axle dependingly mounted for axial rotation with said first member about the same axis of rotation, an annular clutch means rotatively and dependingly sustained from said first member in end abutting relation thereto to rotate about the axis of rotation of said axle in spaced relation thereto, a substantially tubular second member, the inside and outside diameters thereof permitting the said tubular second member to be seated in the space gap between the clutch means and axle, a plurality of longitudinally extending roller trackways on the inner face of said clutch means, a plurality of rollers mounted at one end to said tubular second member adjacent the upper end thereof with the roller element thereof seated in and engaging said roller trackways, spaced-apart slide bearings maintaining the axle, tubular second member and clutch means in concentric spaced relation, a strong compression spring means limiting the movement of said tubular second member inwardly along said trackways, a weaker compression spring means for urging the tubular second member inwardly to said limited position, and an annular trackway connecting the bottom end of said trackways.

2. In a tapping attachment having a first member adapted to be secured to a rotatable spindle for rotation therewith, a second member having a tool-holding means mounted on one end thereof and a clutch means mounted on the opposite end thereof for engaging the second member to the first member for rotation therewith, the improvement which comprises an adjustable means for engaging said clutch means to said first member for rotation therewith, said adjustable means limiting the torque force applied by said first member to said second member through said clutch means to a selected maximum torque force, means slidably mounting the second member on said first member and in and to said clutch means for relative sliding movement therebetween thereby to limit the force applied to the tool to rotary forces, means limiting and controlling the extent of sliding movement of said second member relative to said first member and said clutch means thereby to limit the depth of penetration of the tool in a work piece, and said means limiting and controlling the extent of sliding movement of said second member relative to the first member comprising a stop extension on said second member and an engaging stop extension on said first member, said engaging stop extension being movable toward and away from the first stop extension to provide a determined space gap therebetween.

References Cited in the file of this patent

UNITED STATES PATENTS

| | | |
|---|---|---|
| 2,723,406 | Angst | Nov. 15, 1955 |
| 2,881,454 | Moneymaker | Apr. 14, 1959 |

FOREIGN PATENTS

| | | |
|---|---|---|
| 153,133 | Sweden | Jan. 17, 1956 |